United States Patent
Zhang et al.

(10) Patent No.: US 12,373,228 B2
(45) Date of Patent: Jul. 29, 2025

(54) GPU CAPABILITY REDIRECTION IN VIRTUAL DESKTOP ENVIRONMENTS

(71) Applicant: Omnissa, LLC, Mountain View, CA (US)

(72) Inventors: Yanchao Zhang, Beijing (CN); Lin Lv, Beijing (CN); Yang Liu, Beijing (CN); Yuxin Kou, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 690 days.

(21) Appl. No.: 17/668,285

(22) Filed: Feb. 9, 2022

(65) Prior Publication Data

US 2023/0205557 A1   Jun. 29, 2023

(30) Foreign Application Priority Data

Dec. 29, 2021   (WO) ................ PCT/CN2021/142375

(51) Int. Cl.
*G06F 9/451* (2018.01)
*G06F 9/50* (2006.01)
*G06N 20/00* (2019.01)

(52) U.S. Cl.
CPC ............. *G06F 9/452* (2018.02); *G06N 20/00* (2019.01); *G06F 9/50* (2013.01)

(58) Field of Classification Search
CPC ............ G06F 9/452; G06F 9/50; G06N 20/00
See application file for complete search history.

(56) References Cited

U.S. PATENT DOCUMENTS

| | | | |
|---|---|---|---|
| 2007/0288599 A1* | 12/2007 | Saul | H04L 67/06 709/227 |
| 2014/0136602 A1* | 5/2014 | Hitomi | H04L 67/10 709/203 |
| 2017/0177417 A1* | 6/2017 | Herbert | G06F 11/3409 |
| 2017/0228206 A1* | 8/2017 | Bungert | G06F 3/14 |
| 2021/0011764 A1* | 1/2021 | Kelly | G06F 9/505 |
| 2021/0081142 A1* | 3/2021 | Ding | G06F 3/067 |
| 2021/0160197 A1* | 5/2021 | Liu | H04L 9/003 |

* cited by examiner

*Primary Examiner* — April Y Blair
*Assistant Examiner* — Jonathan R Labud
(74) *Attorney, Agent, or Firm* — Kim & Stewart LLP

(57) ABSTRACT

Techniques are described for redirecting GPU capability from a client device to the virtual desktop. The virtual desktop client includes a GPU controller deployed on the client computing device, which is capable of virtualizing the local GPU of the client device and exposing it to the virtual desktop. The virtual desktop agent operating on the host server includes a GPU consumer, which is capable of accepting machine learning (ML) or artificial intelligence (AI) workloads on the virtual desktop and offload these workloads to the GPU controller on the client computing device. When the GPU consumer detects the ML workload task on the virtual desktop, it transmits the ML workload task over the network to the GPU controller on the client computing device, which processes the ML workload task using the GPU of the client computing device and sends the results of the processing to the GPU consumer.

20 Claims, 6 Drawing Sheets

GPU CAPABILITY REDIRECTION IN VIRTUAL DESKTOP ENVIRONMENTS

CLAIM OF PRIORITY

This application is based upon and claims the benefit of priority from International Patent Application No. PCT/CN2021/142375, filed on Dec. 29, 2021, which is incorporated by reference herein in its entirety.

TECHNICAL FIELD

The present disclosure generally relates to virtual desktops and more specifically to techniques for redirecting GPU capability between client and server in virtual desktop environments.

BACKGROUND

Desktop virtualization technologies, such as those provided as part of a virtual desktop infrastructure (VDI) or desktop-as-a-service (DAAS) offerings, are becoming more commonplace in today's enterprise work environments. The security of having a remotely stored desktop, ability to access the desktop and applications from any location and on any device, centralized desktop management, efficient use of hardware resources, as well as numerous other benefits made possible by VDI/DAAS are a large benefit for many organizations.

There exists a number of implementations of desktop virtualization, some of which offer a full desktop while others provide individual remotely accessible applications. Regardless of the implementation, a common characteristic of these technologies is that application execution takes place on a remote host server usually located in a data center, while the user uses a local client device to access the application over a network connection. For example, in a conventional VDI deployment, each user in an enterprise is provisioned a virtual desktop and is allowed to access their virtual desktop over a remote network connection, such as a WAN connection. The virtual desktops are typically hosted on servers that physically reside in a data center of the enterprise or a third-party service provider and each host server may execute multiple virtual desktops. Users can utilize a client device to remotely log into their individual virtual desktop and the client device communicates with the desktop over the network using a remoting protocol, such as remote desktop protocol (RDP), PC-over-IP protocol (PCoIP), VMware Blast, virtual network computing (VNC) protocol, or the like. Using the remoting protocol, the user can interact with applications of the virtual desktop which are running on the remote host server in such a way that only the display, keyboard, and mouse information is communicated with the local client device. A common implementation of this approach is to host multiple desktop operating system instances on separate virtual machines deployed on a server hardware platform running a hypervisor.

In recent years, artificial intelligence (AI) and machine learning (ML) workloads have become more prevalent across the industry, including within the context of virtual desktops. Machine learning frameworks, such as TensorFlow™ and PyTorch™, utilize deep learning and deep neural networks to solve a variety of problems and, frequently, users and applications on virtual desktops require the ability to execute such AI/ML workloads in an efficient and convenient way. Modern-day machine learning tasks, such as those utilized by these frameworks, often require access to a Graphics Processing Unit (GPU) in order to complete in a reasonably timely manner. For example, training a ML model is typically a hardware intensive task and GPUs are significantly better at handling such hardware intensive tasks than conventional Central Processing Units (CPUs) because GPUs have a large number of cores and are able to process multiple computations simultaneously.

In light of this, some virtual desktop providers have started to offer virtual desktops that have access to GPU capability. In order to provide this capability, these providers typically deploy arrays of GPUs within the data center, which are then virtualized to be shareable among the many virtual machines hosting virtual desktops. However, GPUs are significantly more expensive than CPUs and providing GPU support in a data center involves considerable costs. These costs are then usually recouped by the service provider by increasing pricing on customers that need virtual desktops with GPU capability, and consequently a GPU-enabled virtual desktop is significantly more expensive than a conventional virtual desktop. A more efficient and cost-sensitive solution is desirable.

DETAILED DESCRIPTION

Figure 1:
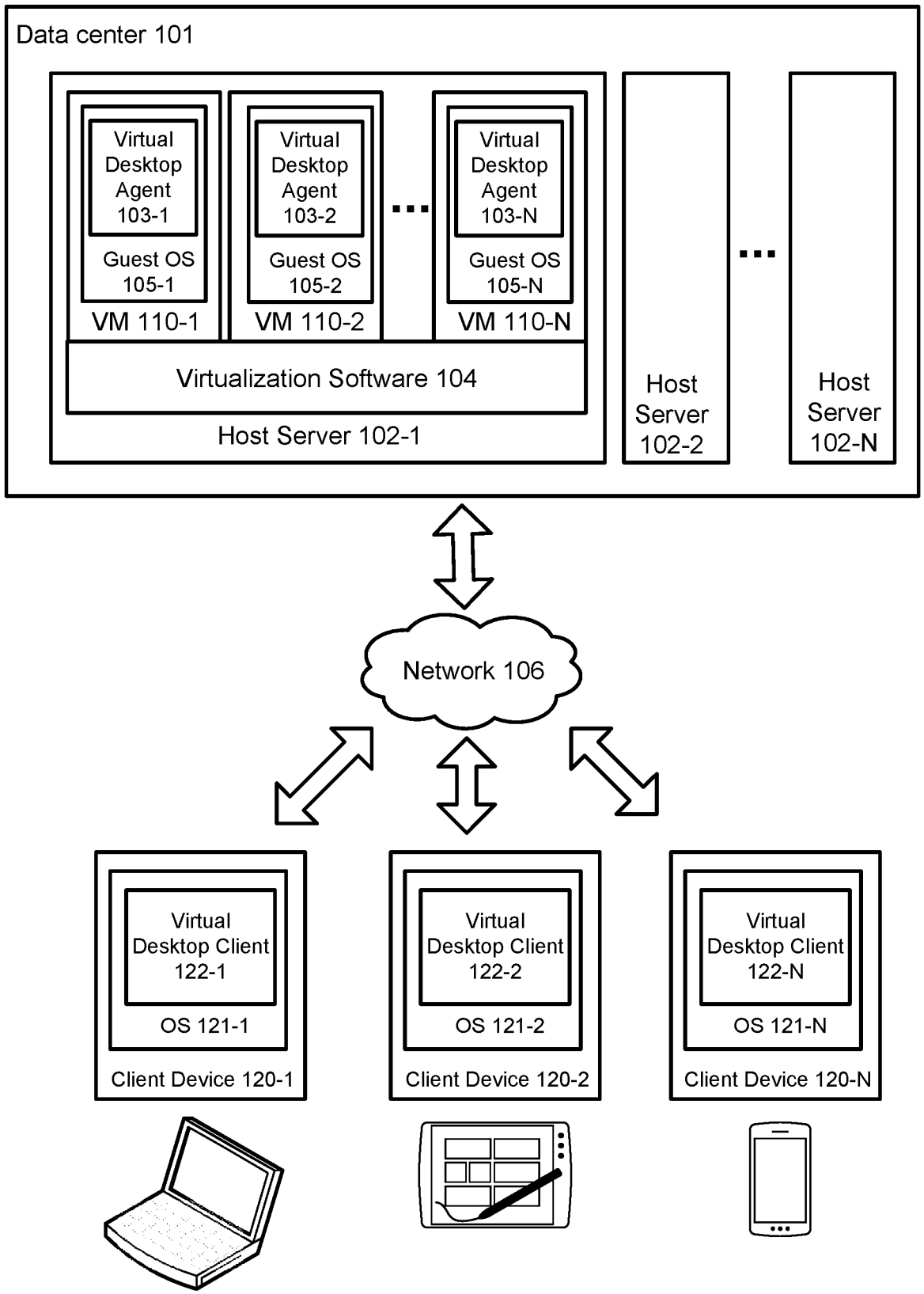
FIG. 1 illustrates an example of a virtual desktop environment, in accordance with various embodiments.

Systems and methods in accordance with various embodiments described herein overcome at least some of the deficiencies described above by redirecting GPU capability between the client and server in virtual desktop environments. As mentioned above, GPUs are typically expensive because they are specialized electronic circuits that are very efficient at manipulating computer graphics and image processing. As such, equipping an entire data center with GPU capability on all servers is often prohibitively costly, even for some of the larger service providers. For this reason, virtual desktop providers that offer GPU capability typically deploy arrays of GPUs and virtualize those GPUs in order to enable many virtual machines access this capability. One example of software that enables GPU virtualization is Bitfusion® available from VMware, Inc. of Palo Alto, California. While virtualizing GPUs in this manner allows the service provider to potentially purchase less GPUs than would otherwise be required, the cost issue persists to some degree because a sufficient number of GPUs must be deployed in order to be able to support all of the virtual desktops that need GPU capability.

It is observed that in the context of VDI, many client computing devices, such as personal computers (PCs), laptops, etc., utilized by users to remotely access their virtual desktops, are already equipped with a powerful graphics card that includes one or more GPUs. While the user is using such a client computing device to access their remote desktop, the local GPU(s) of the client device is frequently idle because majority of the processing is being performed on the remotely located virtual desktop, using the hardware resources of the host server in the data center. The various embodiments described herein utilize this local GPU capacity of the client device and expose that GPU capacity to the virtual desktop.

In various embodiments, the process begins when a virtual desktop session is established between a virtual desktop client operating on a client computing device and a virtual desktop agent operating on a host server. The virtual desktop client is responsible for displaying the desktop user interface (UI) information (i.e. framebuffer pixel data) received from the virtual desktop agent, as well as for capturing local user inputs such as keyboard and mouse events and transmitting them to the virtual desktop agent. Conversely, the virtual desktop agent is responsible for providing the user input to the guest operating system of the virtual desktop on the host server and is also responsible transmitting the UI information stored in the framebuffer of the host server over the network to the virtual desktop client.

In one embodiment, the virtual desktop client includes a GPU controller deployed on the client computing device, which is capable of virtualizing the local GPU of the client device and exposing it to the virtual desktop. Conversely, the virtual desktop agent operating on the host server includes a GPU consumer, which is capable of accepting machine learning (ML) or artificial intelligence (AI) workloads on the virtual desktop and offload these workloads to the GPU controller on the client computing device. In some embodiments, the redirection of the GPU capability from the client computing device to the virtual desktops is made configurable by the user, e.g., when the virtual desktop client is launched, the user is able to select an option to "Share GPU with the Virtual Desktop" to indicate that access to the local GPU should be enabled on the virtual desktop. If GPU redirection is enabled, the GPU consumer operating on the virtual desktop detects a machine learning (ML) workload task in the virtual desktop session on the host server. The ML workload task may be initiated by a user or application on the virtual desktop. As used herein, an ML workload task may include any artificial intelligence or machine learning task that is particularly suited for processing by a GPU. For example, the ML workload task may include training data set used to train a machine learning (ML) model of a deep neural network, such as those based on PyTorch™ or TensorFlow™ frameworks. In alternative embodiments, the GPU consumer is capable of accepting other workload tasks that are well-suited for processing by a GPU that are not necessarily limited to ML or AI based workloads.

When the GPU consumer detects the ML workload task, it transmits the ML workload task (e.g. the training data set, algorithms, etc.) over the network to the GPU controller on the client computing device. In some embodiments, the GPU consumer is configured to selectively determine which ML workloads to send to the GPU controller based on one or more criteria. For example, in one embodiment, the criteria may be based on the size of the training data, such that only training data that is smaller than a particular threshold, or larger than a threshold, is transmitted to be processed by the GPU controller on the client computing device. In another embodiment, the criteria may be based on the bandwidth between the virtual desktop and the client computing device, such that depending on the available bandwidth between the client and the virtual desktop, only smaller ML workloads which are computationally expensive are sent from the GPU consumer to the GPU controller in order to avoid overloading the bandwidth of the connection and cause a poor user experience of accessing the virtual desktop. Yet in other embodiments, if the data center where the virtual desktop is deployed is also equipped with GPU support, the GPU consumer may selectively determine which ML workload tasks to send to the GPU controller on the client computing device and which ML workloads should be handled by the GPUs in the data center that are available to the virtual desktop. This selective determination may be optimized such that large data sets are preferably handled by the GPUs in the data center, while smaller but still computationally heavy workloads are transmitted to the GPU controller to be processed by the client-side GPU.

In various embodiments, the GPU controller receives the ML task and processes the ML workload task using the GPU of the client computing device. The GPU controller is a module or component executing on the client device and capable of virtualizing the GPU of the client device, making the GPU accessible to one or more GPU consumers operating on remote desktops. The GPU controller includes a scheduler to receive requests from one or more GPU consumers and schedule them for processing by the local GPU on the client device. In various embodiments, once the GPU completes processing the ML workload task, the GPU controller transmits the result of the ML workload task over the network to the GPU consumer operating on the host server.

In this manner, the client-side GPU capability is redirected to the virtual desktop, such that the user and/or applications operating on the virtual desktop are able to take advantage of the GPU capability. In some cases, this provides a more cost-efficient approach that utilizes a GPU that is already available on the client, rather than requiring deployment of expensive GPU arrays in the data center. In other cases where GPU support is available in the data center, this approach supplements the GPUs in the data center by providing additional GPU resources and optimizing which workloads are best-handled by the various GPUs. Moreover, the use of virtual channels to carry the ML workloads provides the security and efficiency of traditional virtual desktop access and does not require additional infrastructure to be deployed above and beyond what is already necessary for deploying VDI or DAAS.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
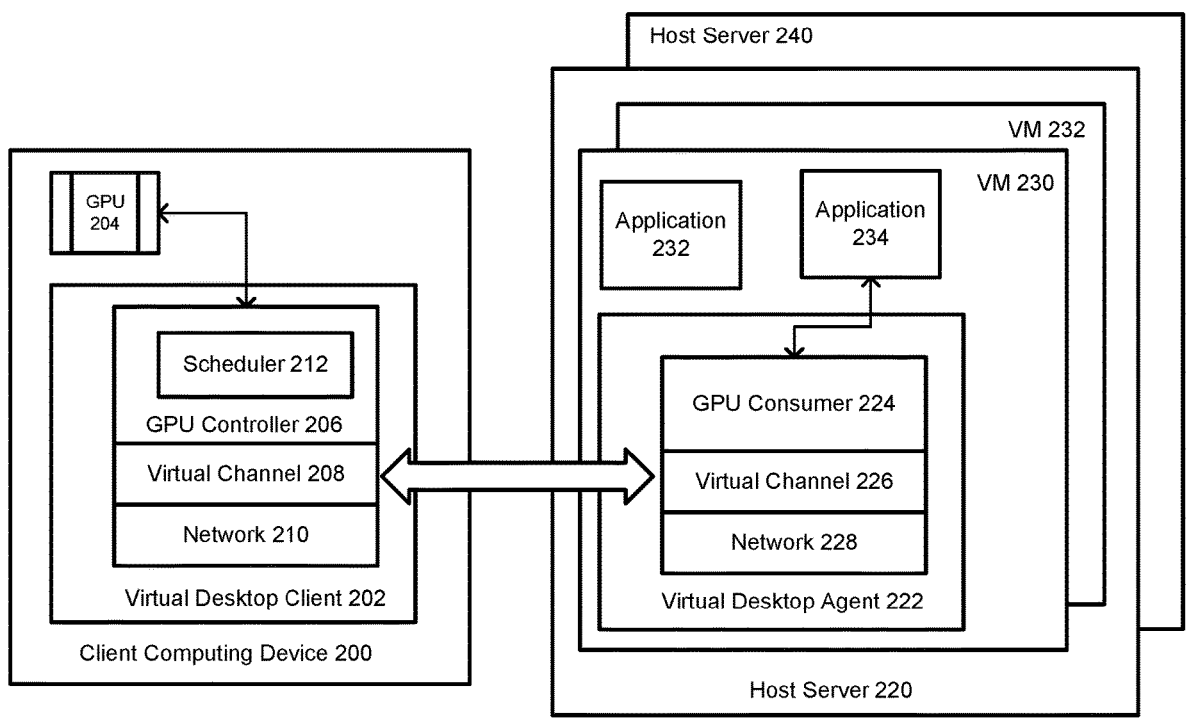
FIG. 2 is an illustration of a system for redirecting GPU capability in a virtual desktop environment, in accordance with various embodiments.

FIG. 2 is an illustration of a system for redirecting GPU capability in a virtual desktop environment, in accordance with various embodiments. As shown in the illustration, the client computing device 200 includes a virtual desktop client 202 that is used to establish a remote desktop session with a virtual desktop agent 222 operating on the host server 220. The host server may be located in a data center remotely located with respect to the client computing device 200 and the virtual desktop client 202 includes the network 210 connection component capable of establishing the virtual desktop session with network 228 connection component of the virtual desktop agent 222 over the network (e.g. a wide area network (WAN) connection, such as Internet or a local area network (LAN) connection). In various embodiments, the network components 210, 228 form the network stack of a desktop remoting protocol, such as Remote Desktop Protocol (RDP), PC-over-IP protocol (PCoIP), VMware Blast, virtual network computing (VNC), or the like.

In the illustrated embodiment, the virtual desktop client 202 includes a GPU controller 206, which is deployed on the client computing device 200 at the time of loading the virtual desktop client 202. The GPU controller 206 virtualizes the GPU 204 of the client computing device 200 by making it accessible to virtual desktops that the user is entitled to. The GPU controller 206 includes a scheduler 212 that is configured to schedule incoming GPU workload tasks from GPU consumers, such as GPU consumer 224, which are located on virtual desktops that the user owns.

In one embodiment, when the GPU controller is launched, it checks whether there are any graphics cards with a GPU 204 installed on the client computing device 200. It may then display a list of all graphics cards that are available on the client device, along with an option for the user to select whether to redirect the GPU capability of each graphics card to the virtual desktop. If the user selects to redirect the GPU capability of the graphics card to the virtual desktop, the GPU controller 206 transmits a message to the GPU consumer 224 operating on the virtual desktop agent 222, indicating that the GPU 204 on the client computing device 200 is ready to be redirected to be used on the virtual desktop. A separate virtual channel (208, 226) is then established between the virtual desktop client 202 and the virtual desktop agent 222, which will be used to transmit GPU workloads between the GPU consumer 224 and the GPU controller 206. The virtual channel can be one of the several virtual channels established as part of the desktop remoting protocol between the virtual desktop client 202 and the virtual desktop agent 222, where other virtual channels are used to transmit the user input data (e.g. keyboard and mouse events), the display pixel data of the virtual desktop graphical user interface (GUI), USB or other drive redirection, and the like.

During operation, when the user is using the various applications (232, 234) on the virtual desktop, a machine learning (ML) workload task (or other GPU workload task) may be initiated by the user or application 234 executing on the virtual desktop. For example, the ML workload task may include training a ML model using a training dataset and a set of specific algorithms. In the illustrated embodiment, the GPU consumer 224 operating on the virtual machine 230 on the host server 220 detects the ML workload task initiated by the application 234 and determines whether to offload the ML workload task for processing to the GPU controller 206 on the client device 200. In some embodiments, the GPU consumer 224 is configured to offload all ML workload tasks to the GPU controller 206. In other embodiments, the GPU consumer 224 applies one or more criteria to selectively determine which workload tasks to offload to the GPU controller 206. For example, one criteria may be based on the size of the training data set of the ML workload task, where only datasets which are smaller than a predetermined threshold are redirected to the GPU controller 206 in order to prevent possibly overloading the network bandwidth between the virtual desktop client 202 and the virtual desktop agent 222 and introducing latencies or other user experience problems for the user accessing the virtual desktop. In some cases, the payload size threshold may be optimized according to the network bandwidth between the virtual desktop client 202 and the virtual desktop agent 222, where larger thresholds are set in cases where the maximum throughput is high and smaller thresholds are set when bandwidth is lower. In some embodiments, the criteria may take into consideration other GPU capacity that is available to the virtual desktop, such as in cases where the data center is equipped with a GPU array that is virtualized and accessible on the virtual desktop. In such deployments, the GPU consumer 224 may be configured with logic to optimize the determination of which ML workloads are best suited for offloading to the GPU controller 206 and which ML workloads are best handled by the GPU array locally available to the host server 220. For example, ML workloads which contain very large training datasets may be handled locally by the GPU array in the data center, while smaller but computationally intensive training datasets are redirected to the GPU controller 206 to be processed by the client-side GPU 204.

In various embodiments, the user may be entitled to more than one virtual desktop and may elect to redirect the GPU capability of their client device to some or all of the virtual desktops that the user may be accessing. For example, the host server 220 may include a plurality of other virtual machines (VMs) and one of those VMs (e.g. VM 232) may be hosting another virtual desktop that the user is able to access using their client computing device 200. Alternatively, the other VM hosting the user's other virtual desktop may be hosted on a different host server, such as host server 240, or in an entirely different data center. In either case, the user may enable the sharing of the GPU 204 of the client computing device 200 with all of the user's virtual desktops or select specific virtual desktops that will be able to access the GPU 204. In cases where multiple virtual desktops are able to access the GPU capacity of the client device 200, the GPU controller 206 is configured to receive incoming GPU workload tasks (e.g. ML workload tasks) from different GPU consumers and virtualize the GPU 204 by allocating shares of the GPU 204 for access by the GPU consumers. As the workload tasks are received from the GPU consumers, the scheduler 212 may schedule them for processing by dispatching the allocated shares of the GPU 204 of the client device. In some embodiments, the workload tasks may be scheduled on a first in, first out (FIFO) basis, while in other embodiments, the scheduling may be optimized depending on the size of the workload task, the expected time to process the workload task, the priority of the virtual desktop, or other factors. For example, the GPU controller 206 may select to process ML workload tasks that are expected to complete quickly over tasks that are expected to take a long time to complete, or perform other optimizations to increase efficiency.

Once the GPU 204 completes processing of the GPU workload task, the GPU controller 206 is configured to transmit the result of the processing to the GPU consumer 224. For example, if the GPU workload task was a ML training dataset with algorithms, the GPU controller 206 may transmit the training result to the GPU consumer 224. In one embodiment, the result may be transmitted over the same virtual channel configured for receiving GPU workload tasks. In other embodiments, a separate virtual channel may be established exclusively for communicating results of the ML workload tasks. Once the GPU consumer 224 receives the results of the GPU workload task, it can communicate the result back to the application 234 that initiated the workload task.

Figure 3A:
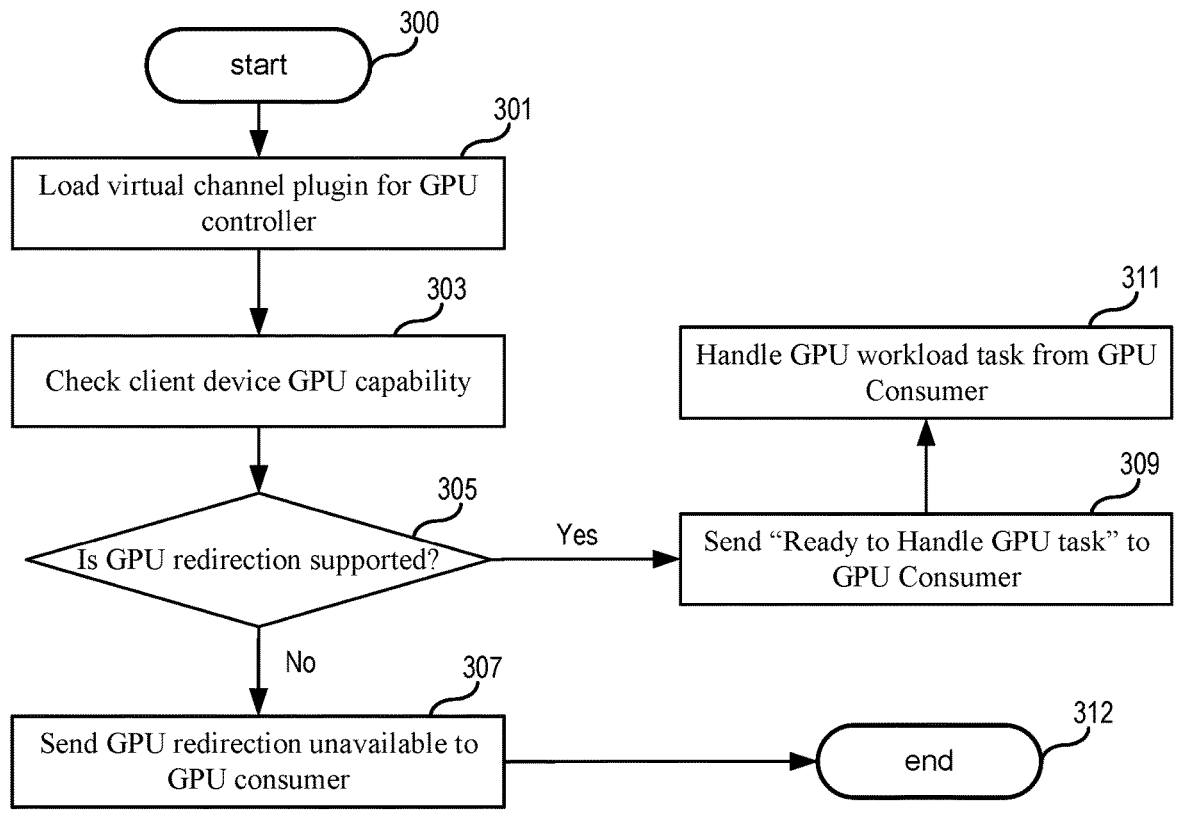
FIG. 3A is an illustration of a process for launching the GPU controller on a client computing device, in accordance with various embodiments.

FIG. 3A is an illustration of a process for launching the GPU controller on a client computing device, in accordance with various embodiments. The operation begins in step 300 when the virtual desktop client is loaded or launched on the client computing device. In operation 301, the virtual channel plugin is loaded for the GPU controller. The virtual channel will be used to communicate ML workload tasks and results between the GPU controller and the GPU consumer. In operation 303, the GPU controller checks the GPU capability of the client computing device in order to determine whether the client device has any graphics card equipped. For example, the GPU controller may query the operating system (OS) drivers of the client computing device to determine whether there are any graphics cards installed on the client device. The GPU controller may then display all available graphics cards/GPUs and wait for user input, indicating which GPU or graphics card is to be redirected to the virtual desktop. In some embodiments, the display listing the available graphics cards may be performed at the time of launching the GPU controller, while in other embodiments, the selection may be made by the user in the configuration screen of the virtual desktop client settings. In operation 305, the GPU controller determines, based on the received input, whether the GPU redirection will be supported to the virtual desktop. If it determines based on user input that the GPU capability will not be available to the GPU consumer (operation 307), the process ends for the GPU controller, as shown in operation 312. If on the other hand, the GPU controller determines that the GPU capability will be redirected, it will send a message to the GPU consumer, indicating that the GPU controller is ready to accept ML workload tasks, as shown in operation 309. Subsequently, the GPU controller will wait to receive ML workload tasks (or other GPU workload tasks) for processing from the GPU consumer, as shown in operation 311.

Figure 3B:
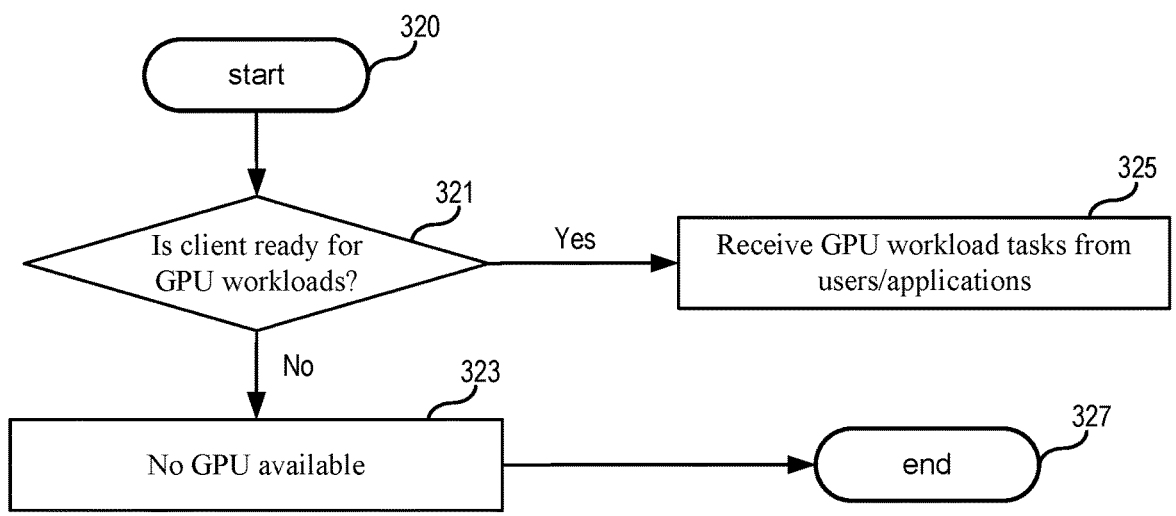
FIG. 3B is an illustration of a process for launching the GPU consumer on a host server, in accordance with various embodiments.

FIG. 3B is an illustration of a process for launching the GPU consumer on a host server, in accordance with various embodiments. The process begins in operation 320, where the GPU consumer is loaded on the virtual desktop agent and waits for the message from the GPU controller. In operation 321, the GPU consumer determines, based on the message received from the GPU controller, whether the client computing device is ready to accept GPU workloads. If the message indicates that there is no GPU available on the client device or the user does not wish to enable GPU redirection, as shown in operation 323, the processing ends, as shown in operation 327. If, on the other hand, the message indicates that the client computing device is ready to accept GPU workload tasks, processing proceeds to operation 325, where the GPU consumer begins accepting ML workload tasks from the applications or from the user on the virtual desktop.

Figure 4:
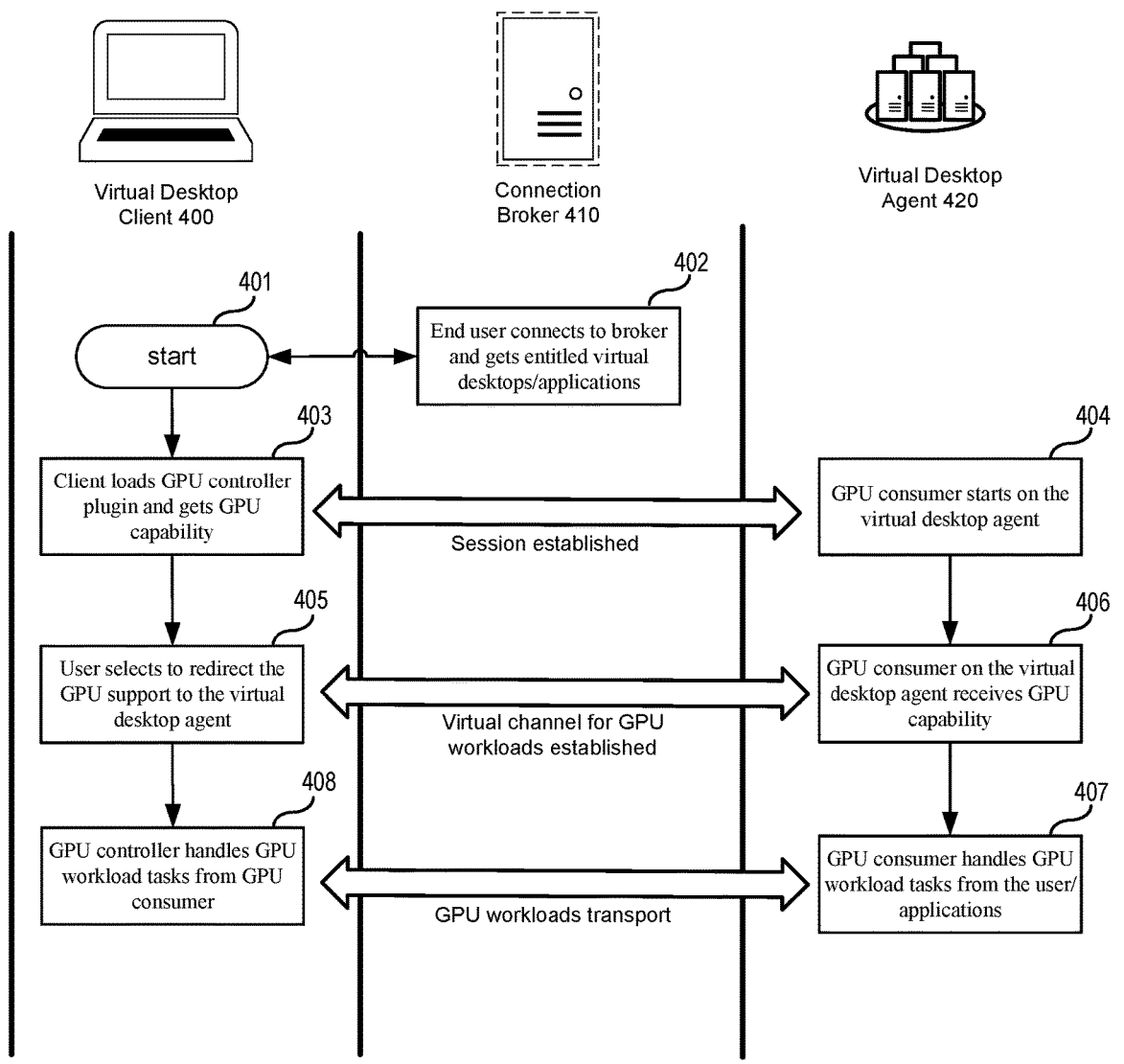
FIG. 4 is an illustration of a swim lane diagram for redirecting GPU capability in a virtual desktop environment, in accordance with various embodiments.

FIG. 4 is an illustration of a swim lane diagram for redirecting GPU capability in a virtual desktop environment, in accordance with various embodiments. As shown in the illustration, the process begins in step 401, where the user launches the virtual desktop client 400. The virtual desktop client 400 then connects to the connection broker 410, which is configured to authenticate the user and determine which virtual desktops the user is entitled to access. In operation 402, the connection broker 410 provides the list of all available virtual desktops that the user is entitled to access to the virtual desktop client 400.

In operation 403, the virtual desktop client is launched on the client device and initiates a virtual desktop session with the virtual desktop agent 420. Similarly, the GPU consumer is loaded by the virtual desktop agent 420 on the host server, as shown in operation 404 and a virtual desktop session is established between the virtual desktop client 400 and the virtual desktop agent 420.

In operation 405, if the client device is GPU capable, the user indicates that GPU capacity should be redirected to the virtual desktop. In operation 406, the GPU consumer receives the message from the GPU controller, indicating that the client device is GPU-capable and that the GPU capacity will be redirected. As shown in the illustration, a virtual channel is then established between the GPU controller and the GPU consumer for communicating GPU workload tasks. Subsequently, the GPU consumer begins to accept GPU workload tasks from the user or applications via the virtual desktop and sending the workload tasks to the GPU controller on the client, as shown in operation 407. The GPU controller receives the GPU workload tasks, processes the tasks and sends results back to the GPU consumer, as shown in operation 408.

Figure 5:
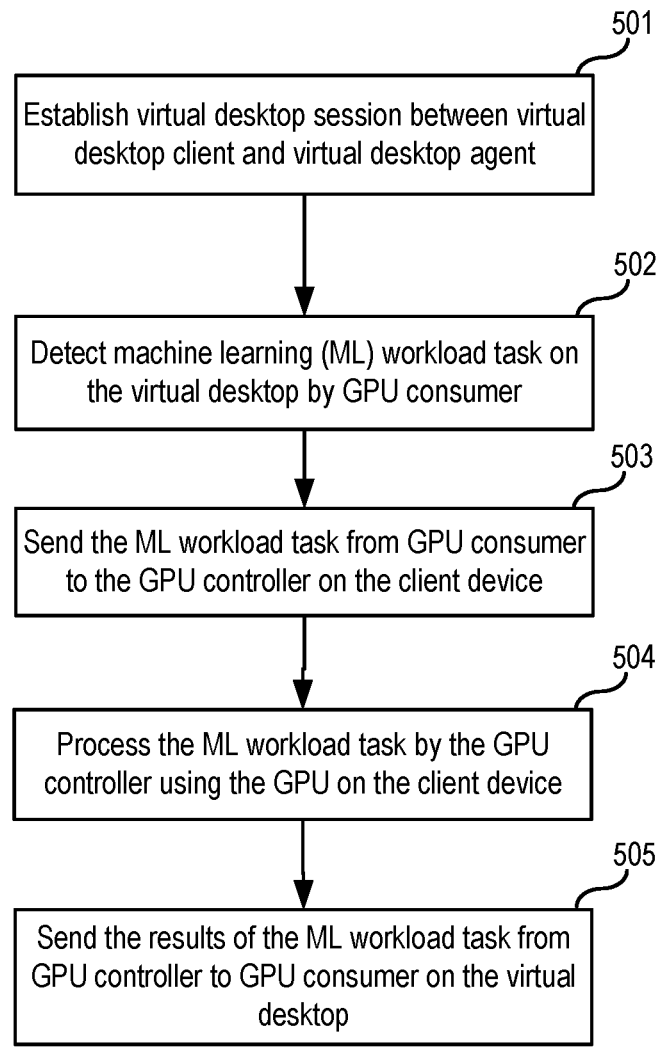
FIG. 5 is an example of a process for redirecting GPU capability in a virtual desktop environment, in accordance with various embodiments.

FIG. 5 is an example of a process for redirecting GPU capability in a virtual desktop environment, in accordance with various embodiments. As shown in operation 501, the process begins by establishing a virtual desktop session between the virtual desktop client executing on the client device and the virtual desktop agent executing on the host server. At this time, the GPU controller is loaded on the client device by the virtual desktop client and the GPU consumer is loaded on the host server by the virtual desktop agent. In operation 502, the GPU consumer detects a ML workload task on the virtual desktop. In operation 503, the GPU consumer transmits the ML workload task to the GPU controller executing on the client device. In operation 504, the GPU controller receives the ML workload task and processes it using the GPU on the client computing device. In operation 505, the GPU controller transmits the results of the ML workload task back to the GPU consumer.

Figure 6:
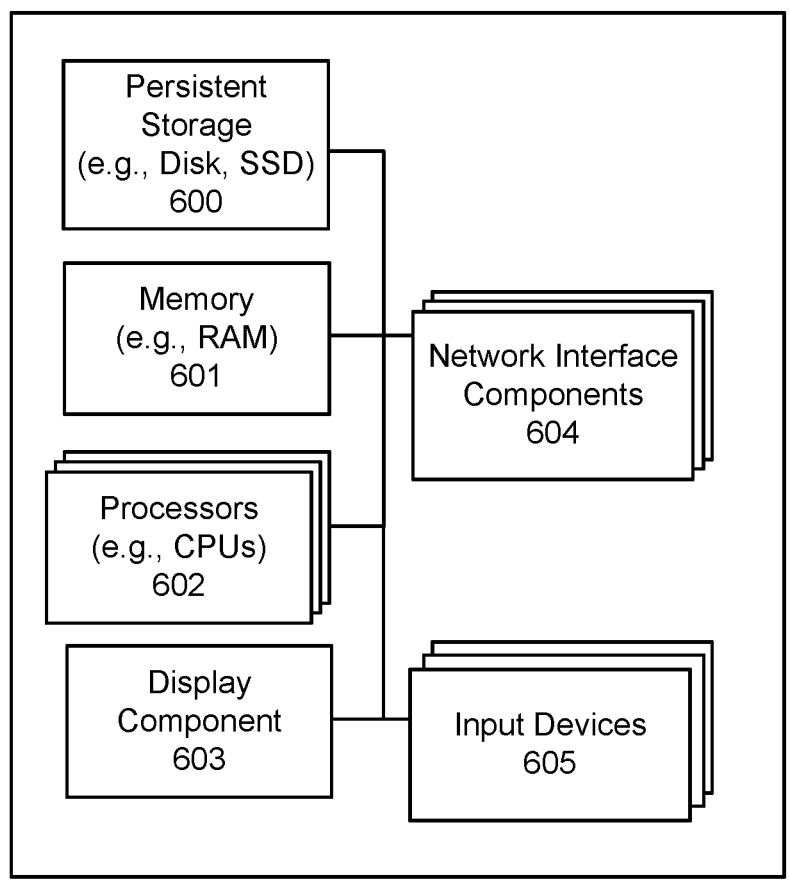
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random-access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for redirecting Graphics Processing Unit (GPU) capability in virtual desktop environments, the method comprising:
    establishing, over a network connection, a virtual desktop session between a virtual desktop client operating on a client computing device and a virtual desktop agent operating on a host server, wherein the client computing device includes a GPU that is accessible by a GPU controller and wherein the host server includes a GPU consumer configured to receive machine learning (ML) workloads in the virtual desktop session;
    detecting a machine learning (ML) workload task in the virtual desktop session on the host server by the GPU consumer;
    determining, based on a size of data associated with the ML workload task, whether to send the ML workload task from the GPU consumer to the GPU controller, wherein the size of the data is compared to a predetermined threshold to determine whether to send the ML workload task;
    in response to determining to send the ML workload task based on the size of the data of the ML workload task, sending the ML workload task from the GPU consumer to the GPU controller on the client computing device;
    processing the ML workload task by the GPU controller using the GPU of the client computing device; and
    sending a result of the ML workload task from the GPU controller to the GPU consumer operating on the host server.

2. The method of claim 1, further comprising:
    establishing a virtual channel of a desktop remoting protocol between the virtual desktop client and the virtual desktop agent, wherein the virtual channel is configured for sending the ML workload task and receiving the result of the ML workload task.

3. The method of claim 2, further comprising:
    detecting a bandwidth measurement for the virtual channel established between the virtual desktop client and the virtual desktop agent; and
    selectively determining which ML workloads to send for processing from the GPU consumer to the GPU controller based on the bandwidth measurement.

4. The method of claim 1, further comprising:
    receiving input indicating whether to redirect the GPU capability between the client computing device and the host server; and
    enabling the sending of the ML workload task from the GPU consumer to the GPU controller in response to said input.

5. The method of claim 1, wherein the data associated with the ML workload task includes training data used to train a machine learning (ML) model.

6. The method of claim 1, wherein
    ML workload tasks having the size of the data that is smaller than the predetermined threshold are determined to be sent from the GPU consumer to the GPU controller.

7. The method of claim 1, wherein the GPU controller on the client computing device is configured to receive ML workload tasks from a plurality of GPU consumers on a plurality of virtual desktops.

8. A computing system, comprising:
    at least one processor; and
    memory including instructions that, when executed by the at least one processor, cause the computing system to perform the operations of:
        establishing, over a network connection, a virtual desktop session between a virtual desktop client operating on a client computing device and a virtual desktop agent operating on a host server, wherein the client computing device includes a GPU that is accessible by a GPU controller and wherein the host server includes a GPU consumer configured to receive machine learning (ML) workloads in the virtual desktop session;
        detecting a machine learning (ML) workload task in the virtual desktop session on the host server by the GPU consumer;

determining, based on a size of data associated with the ML workload task, whether to send the ML workload task from the GPU consumer to the GPU controller, wherein the size of the data is compared to a predetermined threshold to determine whether to send the ML workload task;

in response to determining to send the ML workload task based on the size of the data of the ML workload task, sending the ML workload task from the GPU consumer to the GPU controller on the client computing device;

processing the ML workload task by the GPU controller using the GPU of the client computing device; and sending a result of the ML workload task from the GPU controller to the GPU consumer operating on the host server.

9. The computing system of claim 8, wherein the memory further includes instructions that, when executed by the at least one processor, cause the computing system to perform the operations of:

establishing a virtual channel of a desktop remoting protocol between the virtual desktop client and the virtual desktop agent, wherein the virtual channel is configured for sending the ML workload task and receiving the result of the ML workload task.

10. The computing system of claim 9, wherein the memory further includes instructions that, when executed by the at least one processor, cause the computing system to perform the operations of:

detecting a bandwidth measurement for the virtual channel established between the virtual desktop client and the virtual desktop agent; and selectively determining which ML workloads to send for processing from the GPU consumer to the GPU controller based on the bandwidth measurement.

11. The computing system of claim 8, wherein the memory further includes instructions that, when executed by the at least one processor, cause the computing system to perform the operations of:

receiving input indicating whether to redirect the GPU capability between the client computing device and the host server; and enabling the sending of the ML workload task from the GPU consumer to the GPU controller in response to said input.

12. The computing system of claim 8, wherein the data associated with the ML workload task includes training data used to train a machine learning (ML) model.

13. The computing system of claim 8, wherein

ML workload tasks having the size of the data that is smaller than the predetermined threshold are determined to be sent from the GPU consumer to the GPU controller.

14. The computing system of claim 8, wherein the GPU controller on the client computing device is configured to receive ML workload tasks from a plurality of GPU consumers on a plurality of virtual desktops.

15. A non-transitory computer readable storage medium comprising one or more sequences of instructions, the instructions when executed by one or more processors causing the one or more processors to execute the operations of:

establishing, over a network connection, a virtual desktop session between a virtual desktop client operating on a client computing device and a virtual desktop agent operating on a host server, wherein the client computing device includes a GPU that is accessible by a GPU controller and wherein the host server includes a GPU consumer configured to receive machine learning (ML) workloads in the virtual desktop session;

detecting a machine learning (ML) workload task in the virtual desktop session on the host server by the GPU consumer;

determining, based on a size of data associated with the ML workload task, whether to send the ML workload task from the GPU consumer to the GPU controller, wherein the size of the data is compared to a predetermined threshold to determine whether to send the ML workload task;

in response to determining to send the ML workload task based on the size of the data of the ML workload task, sending the ML workload task from the GPU consumer to the GPU controller on the client computing device;

processing the ML workload task by the GPU controller using the GPU of the client computing device; and sending a result of the ML workload task from the GPU controller to the GPU consumer operating on the host server.

16. The non-transitory computer readable storage medium of claim 15, wherein the memory further comprises instructions executed by one or more processors and causing the one or more processors to execute the operations of:

establishing a virtual channel of a desktop remoting protocol between the virtual desktop client and the virtual desktop agent, wherein the virtual channel is configured for sending the ML workload task and receiving the result of the ML workload task.

17. The non-transitory computer readable storage medium of claim 16, wherein the memory further comprises instructions executed by one or more processors and causing the one or more processors to execute the operations of:

detecting a bandwidth measurement for the virtual channel established between the virtual desktop client and the virtual desktop agent; and selectively determining which ML workloads to send for processing from the GPU consumer to the GPU controller based on the bandwidth measurement.

18. The non-transitory computer readable storage medium of claim 15, wherein the memory further comprises instructions executed by one or more processors and causing the one or more processors to execute the operations of:

receiving input indicating whether to redirect the GPU capability between the client computing device and the host server; and enabling the sending of the ML workload task from the GPU consumer to the GPU controller in response to said input.

19. The non-transitory computer readable storage medium of claim 15, wherein the data associated with the ML workload task includes training data used to train a machine learning (ML) model, and wherein ML workload tasks having the size of the data that is smaller than the predetermined threshold are determined to be sent from the GPU consumer to the GPU controller.

20. The non-transitory computer readable storage medium of claim 15, wherein the GPU controller on the client computing device is configured to receive ML workload tasks from a plurality of GPU consumers on a plurality of virtual desktops.

* * * * *